UNITED STATES PATENT OFFICE.

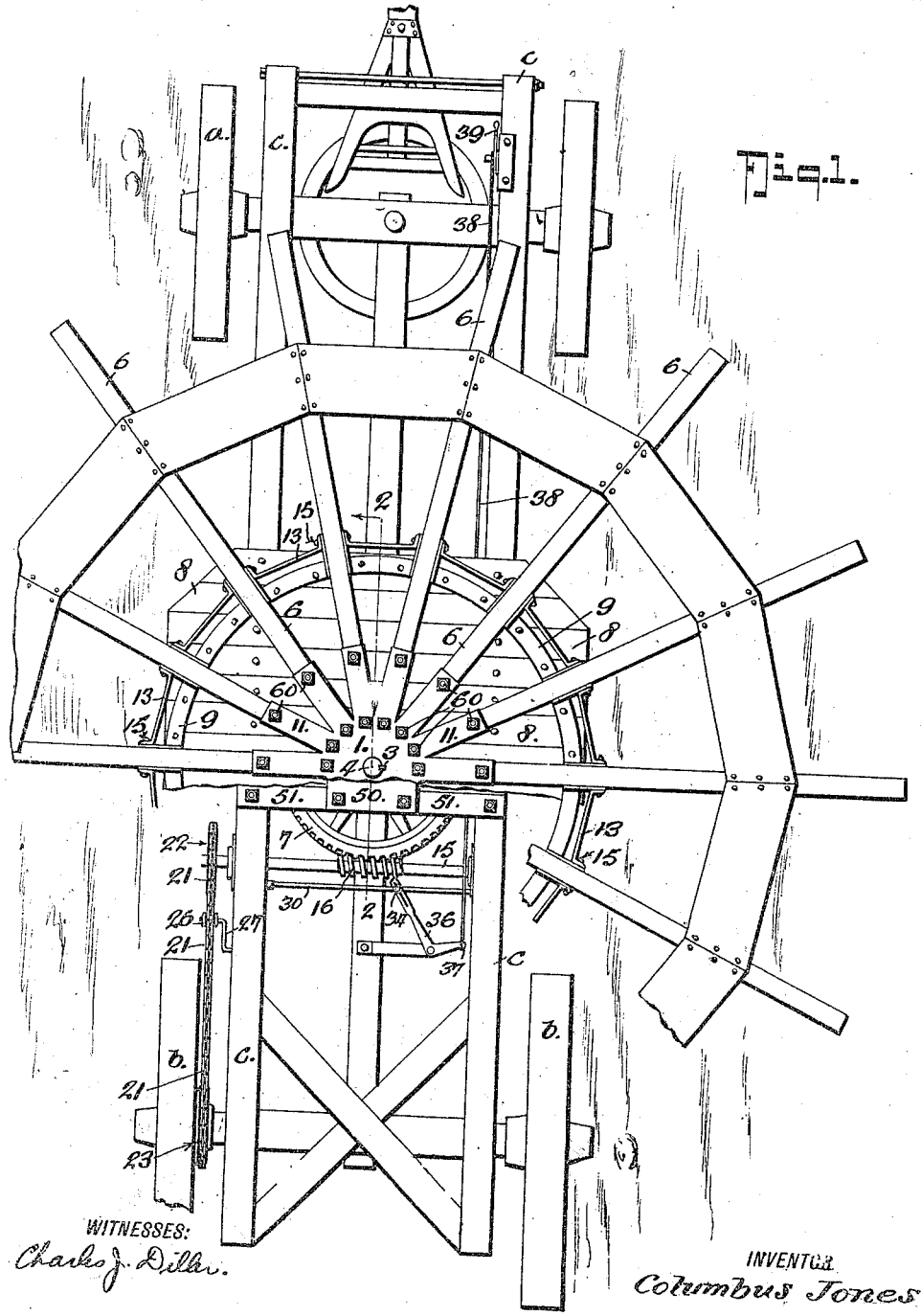

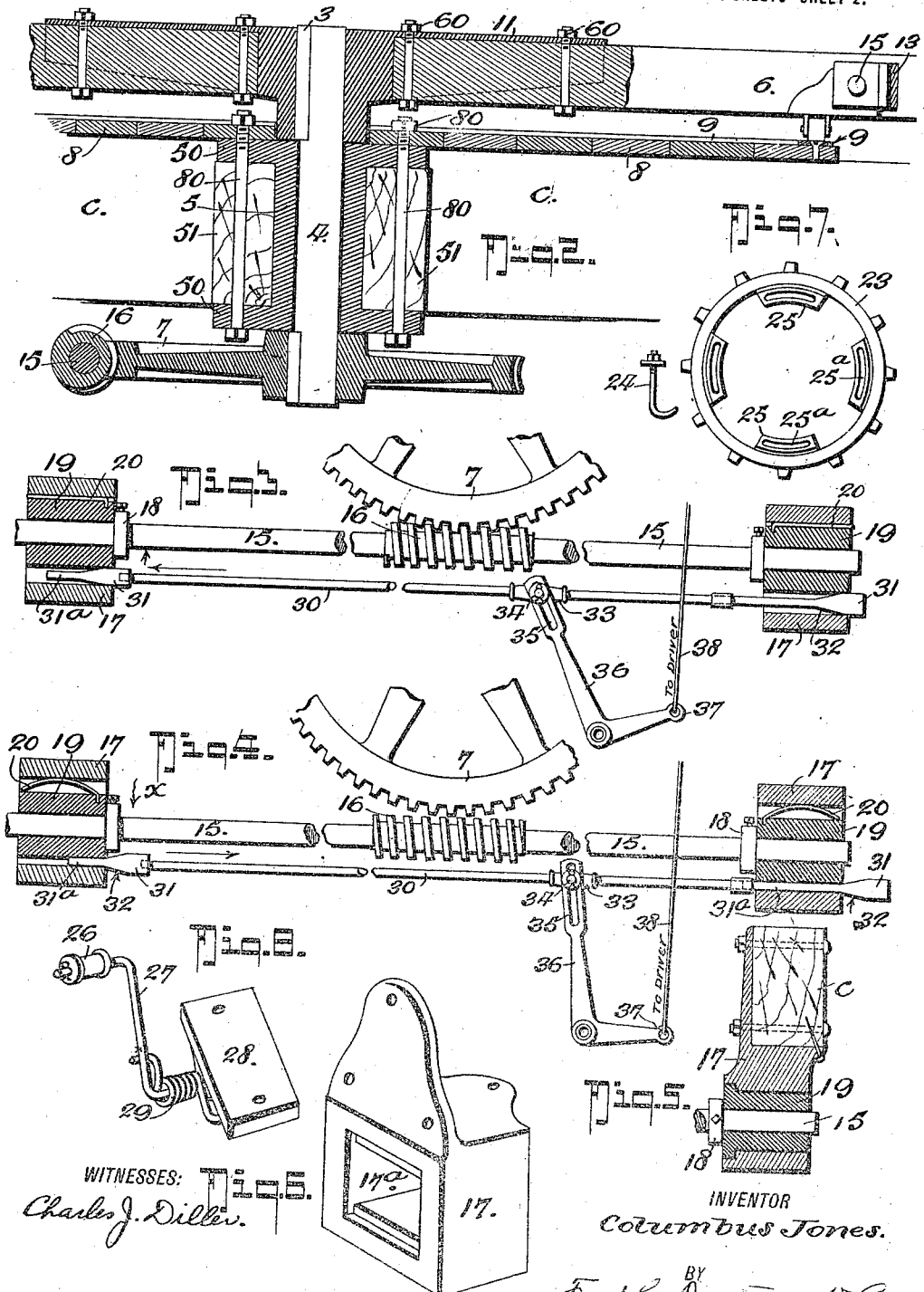

COLUMBUS JONES, OF WASHINGTON, KANSAS.

REVOLVING HAY-RACK.

1,239,107. Specification of Letters Patent. Patented Sept. 4, 1917.

Application filed September 9, 1916. Serial No. 119,187.

*To all whom it may concern:*

Be it known that I, COLUMBUS JONES, residing at Washington, in the county of Washington and State of Kansas, have invented certain new and useful Improvements in Revolving Hay-Racks, of which the following is a specification.

This invention has reference to improvements in revolving racks and more particularly racks designed for being used in connection with hay loaders and primarily has for its purpose to provide a revolving hay rack of a simple and inexpensive character in which the parts are coöperatively so arranged whereby they may be readily mounted upon a wheeled truck, easily manipulated, and which readily serve their intended purposes.

Another object of my invention is to provide an improved construction of revolving hay rack in which is included an improved control mechanism operable from the driver's wagon seat for throwing the rack actuated mechanism, that is driven from one of the rear truck wheels, into and out of operative condition.

With other objects in view, my invention further consists in the peculiar combination and novel arrangement of the parts hereinafter described, specifically pointed out in the appended claims and illustrated in the accompanying drawings, in which:

Figure 1 is a plan view of my revolving rack, the same being shown as operatively applied to a wagon truck for loading hay. Fig. 2 is a longitudinal section thereof on the line 2—2 of Fig. 1, looking in the direction of the arrow. Fig. 3 is a detail plan view of the worm shaft with its coacting shifting mechanism, the said shaft being shown in the operative position. Fig. 4 is a similar view that shows the worm shaft and its coöperating shifting mechanism positioned for holding the shaft out of gear with the revolving rack. Fig. 5 is a longitudinal section of one of the bearing boxes for the worm shaft. Fig. 6 is a detail perspective view of one of the bearing brackets hereinafter specifically mentioned. Fig. 7 is a detail face view of the sprocket that is clamped to one of the rear truck wheels and hereinafter further referred to, and Fig. 8 is a detail perspective view of the drive chain tightener device.

In the practical application of my invention, the improved revolving rack mechanism is mounted upon a suitable truck or wagon frame which includes the usual front or steering wheels $a$—$a$, the rear truck wheels $b$—$b$ and the longitudinal side timbers $c$—$c$.

The revolving rack comprises a casting 1 that includes a hub portion fixedly mounted, by a key 3, on the upper end of a vertical shaft 4, journaled in a tubular bearing 5, having upper and lower head portions 50—50 that are secured to the wagon frame timbers 51—51, which in practice are spaced $8\frac{1}{2}$ feet from the front end of the truck frame and are spaced sufficiently apart to embrace the bearing 5, as is clearly shown in Fig. 2.

The rack casting 1 includes a series of radial arms 11 ⊓ shaped in cross section, 14 of such arms in practice being provided, each of which is adapted to receive the inner end of a timber 6 and the said inner ends are made fast to the casting arms 11 by the clamp bolts and nuts 60, as shown.

7 designates a horizontal cog gear that is keyed upon the lower end of the shaft 4 and which is driven by a worm drive shaft presently again referred to.

A platform 8 is supported upon the upper head portions 50 of the bearing 5 and the said platform is secured to the said head portions or top members 50 by bolts 80 that secure the upper and lower heads 50 to the frame timbers 51—51, as is best shown in Fig. 2.

A circular metal trackway 9 is mounted on the platform 8 and the said trackway is in the nature of a flat ring two inches wide and provided at suitable intervals with holes for receiving the screws that attach it to the platform.

To facilitate the easy revolving of the rack, a caster-like roller bearing is attached to each of the radial arms for engaging the said trackway 9 see Fig. 2 and, for bracing the several radial arms, an iron strap 13, having apertured angle ends is secured between each adjacent pair of the radial arms by bolts 15 which secure the caster roller brackets to the said arms, as is shown in detail in Fig. 2.

15 designates what I hereinafter term the driving shaft, since on this shaft is mounted the worm gear 16 that engages the cog gear 7.

Shaft 15 has its ends journaled in flat boxes 19 that are mounted in horizontal apertures 17ᵃ formed in the pendent ends of hanger brackets 17 bolted to the side timbers c of the track frame.

To hold the shaft 15 from endwise thrust within the bearing boxes 19, collars 18 are clamped thereto by set screws, as shown.

To provide for quickly shifting the shaft 15 to bring its worm gear 16 into and out of operative connection with the cog gear 7, the horizontal apertures 17ª, in which the boxes 19 are held, are sufficiently elongated to allow for a limited lateral shifting of the said boxes 19 therein, and which are normally thrust in the direction indicated by the arrow x, see Fig. 4, by the springs 20 that are interposed between the front sides of the boxes 19 and the adjacent wall of the box bearing to thereby normally tend to force the shaft 15 outwardly to move the worm gear 16 out of mesh with the cog gear 7, as shown.

Power is transmitted to the shaft 15 by a driving chain 21 that takes over a chain gear 22 keyed to one of the outer ends of the shaft 15 and over an open sprocket gear 23 that is secured to the left rear truck wheel by clip bolts 24 which pass around the spokes of the said rear truck wheel and through segmental brackets 25 formed on the said gear 23. The brackets 25 have elongated segmental slots 25ª through which the said clip bolts pass to provide for applying the gear 23 onto wagon spokes of different makes of trucks.

By reason of the peculiar arrangement of the parts so far described, when the rack is out of gear, the worm shaft is automatically moved back sufficiently to disengage the worm 16 from the cog gear 7 by the pressure of the springs 20 which engage the boxes 19.

To hold the drive chain at its different adjustments, a chain tightener coöperatively engages the same, as is best shown in Fig. 8, by reference to which it will be seen that the tightener includes a flanged roller 26 mounted on the crank arm 27, journaled in a bracket piece 28 attached to the under face of the side timber adjacent the chain. 29 indicates a coil spring device mounted on the crank arm that serves to hold the pulley under pressure against the chain.

For manually shifting the worm shaft into gear with the cog gear 7, I have provided a shifting bar 30, on each end of which is connected by screw couplings, a wedge block 31, each of which includes a thin, flat extension 31ª and an inclined or wedge portion 32 and in the practical application of the said bar 30, the thin, flat end extends between the boxes 19 and the adjacent bearing walls of the hanger opposite that side on which the springs 20 hereinbefore referred to are located.

Bar 30 has a T portion 33 that is provided with a lug 34 for engaging with the elongated slot 35 in one end of a bell crank lever 36 that is suitably mounted on the main frame and whose end 37, through a link rod 38, connects with a hand lever 39 that is located adjacent the driver's seat at the front end of the truck frame and which in practice is provided with the usual rack and detent devices.

From the foregoing description taken in connection with the drawings, the complete construction, the manner of operation and the advantages of my invention will be readily apparent to those skilled in the art to which the same relates.

By reason of mounting the revolving rack in the manner shown and described, the operation of loading onto the rack is easily effected, since the radial arms can be brought around to receive the load thereon as conditions may require, it being understood that the rack will be geared up with the power transmission just as long as the driver's lever is set to shift the worm shaft to mesh with the cog gears 7 on the rack, it being also understood that just as soon as the operator moves the control lever to release the power transmission, the worm shaft automatically drops back to release its worm from the gear 7.

By providing a shifting bar, before referred to, with beveled like members that coöperate with the boxes 19, as before described, as the said bar is shifted to effect an operative connection of the power transmission, the bevel portions of the end blocks engage the boxes 19—19 and shoves them laterally against the tension of the opposing springs 20 and thereby brings the worm shaft over to cause its worm member to mesh with the gear 7.

While the arrangement of the parts as illustrated and described present a practical combination of elements, I desire it understood that the said parts may be readily modified to suit varied required conditions without departing from my invention as expressed in the appended claims.

What I claim is:

1. The combination with a wheeled truck, said truck including side bearings and transverse bars; of a revolving rack mechanism, said mechanism including a vertically disposed rotary shaft supported between the aforesaid transverse bars, a platform fixedly mounted on the said bars, and an annular trackway on the said platform, the said rack including a head provided with radial extensions, arms secured to the said radial extensions, a roller mounted on some of the arms that engages the trackway on the platform, and a cog gear on the lower end of the rotary shaft; of a transversely disposed shiftable shaft, a transmission worm gear on the said shaft adapted for engaging the cog gear on the rotary shaft, means tending to automatically hold the worm shaft shifted to a position for drawing the worm gear from the shaft cog gear, transmission mechanism that connects the worm gear shaft and one of the rear truck wheels and manually operated means coöperatively combined with the worm shaft and adapted under one adjustment to move and hold the said worm shaft with its worm gear in mesh with the cog gear on the rotary rack.

2. The combination with a wheeled truck, said truck including side bearings and transverse bars; of a revolving rack mechanism, said mechanism including a vertically disposed rotary shaft supported between the aforesaid transverse bars, a platform fixedly mounted on the said bars, and an annular trackway on the said platform, the said rack including a head provided with radial extensions, arms secured to the said radial extensions, a roller mounted on some of the arms that engages the trackway on the platform, and a cog gear on the lower end of the rotary shaft; of a transversely disposed shiftable shaft, a transmission worm gear on the said shaft adapted for engaging the cog gear on the rotary shaft, and laterally shiftable bearing boxes for the said shaft, means tending to automatically hold the worm shaft shifted to a position for drawing the worm gear from the shaft cog gear, transmission mechanism that connects the worm gear shaft and one of the rear truck wheels and manually operated means coöperatively combined with the worm shaft and adapted under one adjustment to move and hold the said worm shaft with its worm gear in mesh with the cog gear on the rotary rack, said mechanism including a laterally shiftable rod having cam portions for engaging the bearing boxes on the worm shaft and adapted when shifted in one direction to shift the said bearing boxes to move the worm shaft to cause its worm gear to mesh with the gear on the said rack shaft.

3. In a revolving rack of the character described, the combination with a wheeled truck that includes front and back truck wheels, sides beams and cross bars and a sprocket gear secured to one of the rear truck wheels; of a rotary rack mechanism that includes a vertical shaft having a cog gear at the lower end and a head portion provided with radially extended members, arms secured to the said members, a tubular bearing for the rack shaft secured between the cross bars of the truck, a platform mounted on the upper end of the said bearing, a trackway on the platform, roller bearings on the rack arms that engage the said platform trackway, spacers for holding the arms rigidly apart, a power transmission which includes a transversely mounted worm shaft, a drive gear at one end of the said shaft and a chain drive that takes over the said gear and the sprocket gear on the rear truck wheel, the said worm shaft being mounted in bearing boxes, having a limited lateral movement in their supports, means tending to normally move the said boxes and the shaft to disengage the worm on the shaft from the cog gear on the revolving rack, and manually operable means that coöperates with the said worm shaft for shifting the said shaft to bring and hold its worm gear in mesh with the cog gear on the revolving rack.

COLUMBUS JONES.